United States Patent [19]

Wickman et al.

[11] Patent Number: 4,556,322
[45] Date of Patent: Dec. 3, 1985

[54] ARRANGEMENT FOR CHECKING DIMENSIONAL ACCURACY

[75] Inventors: Kjell J. Wickman, Stockholm; Klas R. Wiklund, Täby both of Sweden

[73] Assignee: Pharos AB, Lidingo, Sweden

[21] Appl. No.: 580,699

[22] Filed: Feb. 16, 1984

Related U.S. Application Data

[63] Continuation-in-part of Ser. No. 256,909, Apr. 23, 1981, abandoned.

[30] Foreign Application Priority Data

Apr. 23, 1980 [SE] Sweden .................... 8003079

[51] Int. Cl.$^4$ .................... G01B 11/14; G01C 3/02; G02F 1/29
[52] U.S. Cl. .................... 356/375; 350/381; 356/1
[58] Field of Search .................... 356/1, 372, 375–376, 356/394; 350/171, 286, 301, 334, 347 R, 347 V, 381–383, 385, 388, 402, 6, 4, 170, 602; 33/180 AT, 174 PC, 228, 288

[56] References Cited

U.S. PATENT DOCUMENTS

| | | | |
|---|---|---|---|
| 2,390,652 | 12/1945 | Ives | 356/10 |
| 3,433,139 | 3/1969 | Beyen et al. | 350/382 |
| 3,545,086 | 12/1970 | Brill et al. | 33/228 |
| 3,765,764 | 10/1973 | Niss | 350/287 |
| 3,817,631 | 6/1974 | Kawahara | 356/1 |
| 3,918,438 | 11/1975 | Hayamizu et al. | 350/301 |

FOREIGN PATENT DOCUMENTS 46712 4/1980 Japan .................... 350/6.4

OTHER PUBLICATIONS

Kallard, T., "Exploring Laser Light", Optosonic Press 1977, pp. 18–19.
Lubrunie et al., "Nematic Liquid Crystal Digital Light Deflector", App. Optics, 8–1974, pp. 1802–1806.
Stocker, Jr., W. M., "Tape-Controlled 'Inspector' Measures in Six Axes", American Machinist, 2-9-59, pp. 101–103.

Primary Examiner—William H. Punter
Attorney, Agent, or Firm—Larson and Taylor

[57] ABSTRACT

An arrangement for measuring dimensions and/or checking the dimensional accuracy of large objects (1), such as car bodies or the like. The arrangement comprises a straight movement path (8) and one or a plurality of transmission units (10) movable along the path. During indication of each checking point which may comprise a bolt head, a suspended measuring rod (2-7) or the like, two measuring light beams are projected onto the point concerned from two different directions. When the light beams are projected, two are predetermined and one a variable of the following components: the distance between the starting positions for the first and the second light beam, the angular position between the first light beam and a line drawn between the starting positions and the angular position between the second light beam and said line. It is first ensured by movement of a transmission unit (10) that one of the light beams with a fixed angular relationship to the movement path impinges on the checking point or on a point at which, according to data for the object, the checking point should lie and subsequently the variable component is altered with a controllable control unit (11) so that the second measuring light beam also impinges on the checking point or on a point at which the checking point should lie according to data for the object.

20 Claims, 17 Drawing Figures

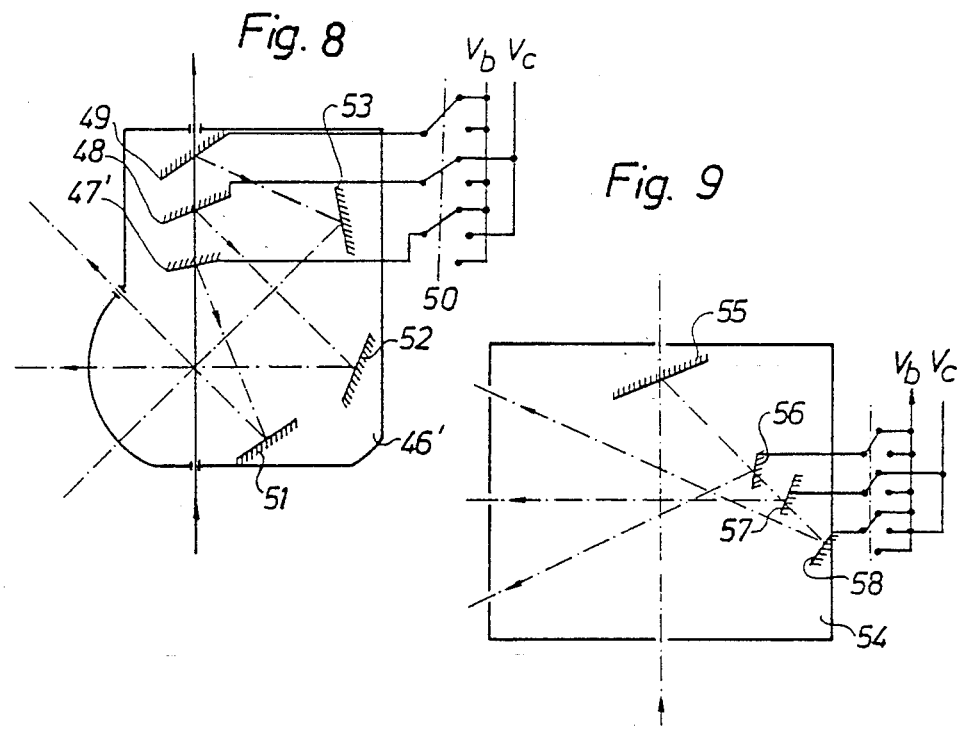
Fig. 8
Fig. 9
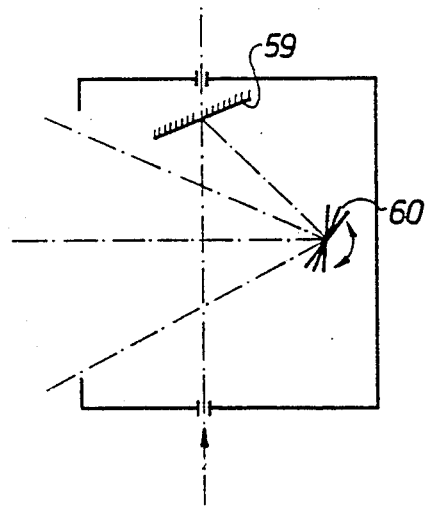
Fig. 10
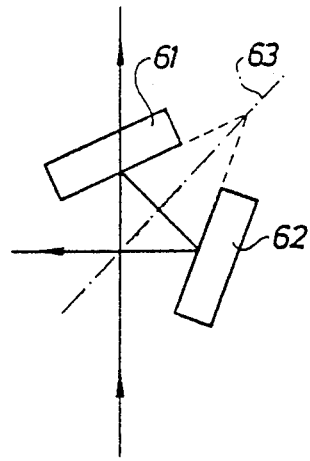
Fig. 11

ARRANGEMENT FOR CHECKING DIMENSIONAL ACCURACY

This is a continuation-in-part of application Ser. No. 256,909 filed Apr. 23, 1981, and now abandoned.

The present invention relates to an arrangement for checking the dimensional accuracy of or measuring the dimensions of large heavy objects such as car bodies.

The modern car with a monocoque body is manufactured in large series with accurate precision. The engine, power transmission, front assembly and rear assembly are fitted more or less directly to the body on reinforcements and brackets welded to the body. The function of the car is highly dependent on that the attachment points for e.g. the steering units for the front and rear assemblies always occupy the positions and have the appearance intended by the manufacturer.

In the event of a collision, the impact forces are frequently propagated into the body shell with residual deformations in consequence. Without thorough inspection and measurement, it may be difficult to localize any deformations, and this may have a detrimental effect on the driving characteristics of the car. Compensation for minor deformations in the chassis is possible by means of the adjustment facilities incorporated in the front assembly. Under no circumstances, however, is it acceptable for the attachment positions for the front assembly suspension to be "moved" by enlarging bolt holes etc.

U.S. Pat. No. 3,765,764 discloses an arrangement for checking if a car retains the correct dimensions for the car model concerned, for instance after a collision. The car is hosited in a device such as a jig or an alignment bench.

The points in a car which are used to check the measurements of the chassis consist of fixture holes and attachment holes for bolts and bolted joints under the car. In order to be able to define these measuring points, use is made of so-called measuring point units which are attached to all relevant checking points in the car chassis. Suspended in each measurement point unit is a ruler which is provided with a millimeter scale and a travelling rider which may be preset at a nominal height level. By reading where a beam of light impinges on the rulers, it is possible to directly determine the height deviations of the chassis. Reflecting colour markings make it easy to check the position of the beam of light on the rulers at a range of several meters.

The light comes from a laser which emits a virtually parallel red beam of light along a lengthwise guide bar. The beam of light strikes a deflection unit where it is divided into two beams perpendicular to each other. One light beam continues along the aforesaid lengthwise guide bar while the other is directed at right angles out from the said guide bar. When the deflection unit, which is movable, is moved along the lengthwise guide bar, the perpendicular light beam will also be displaced along the guide bar and impinge on one ruler at a time. The distance between the rulers can then be directly read off on a measuring tape line of roll-up type which is located on the lengthwise guide bar.

In this manner, all the longitudinal and vertical dimensions of the car chassis are measured. In order to measure the width dimensions, the deflection unit is moved to the extreme end of the lengthwise guide bar. The deflection unit now emits a beam of light along the transverse guide bar where measurements are made in the same manner as in the case of the lengthwise guide bar.

If the car needs to be aligned, the operator sets the deflection units on the respective guide bars consecutively in those positions in which they according to the data for the car model concerned are to be placed in order for the light beam normally to impinge on the rulers. If, in any position, the light beam does not then impinge on the ruler concerned, the car is aligned until this occurs.

In certain circumstances, it is inappropriate to have two mutually transverse beams. One of these guide bars, for example the shorter one for measurement of the width dimensions of the vehicle, often constitutes an obstruction to working operations at the front or rear end of the vehicle.

An object of the present invention is to eliminate this disadvantage. According to the invention, use is made of only one straight guide bar and at least one slide movable along the guide bar. From the slide, a first narrow light beam is projected at an angle to the guide bar. In measuring, the light beam is arranged to impinge consecutively on checking points such as for example bolt heads, suspended measuring rods or the like. The position of the slide on the beam for impingement on a checking point is noted for each check point. In measuring, either the same slide is arranged to project for each checking point in addition to the first light beam a second light beam with a starting point at a distance from the first light beam or else there is a second movable slide on the guide bar which projects a second light towards the checking point. The first light beam and the second light beam have two predetermined and one variable of the following components: the distance between the starting points for the first and the second beam, the angular position between the first beam and the said distance and the angular position between the second beam and the said distance. One of the units has a control unit manoeuvrable by the operator for the variable component.

BRIEF DESCRIPTION OF THE DRAWINGS

A more detailed description of the invention now follows, wherein reference is made to the accompanying drawings, in which FIGS. 8–11 show embodiments of deflection units used in conjunction with the invention and FIGS. 12–17 show different embodiments of deflection units settable for right/left deflection.

DETAILED DESCRIPTION OF THE PREFERRED EMBODIMENTS

Figure 1:
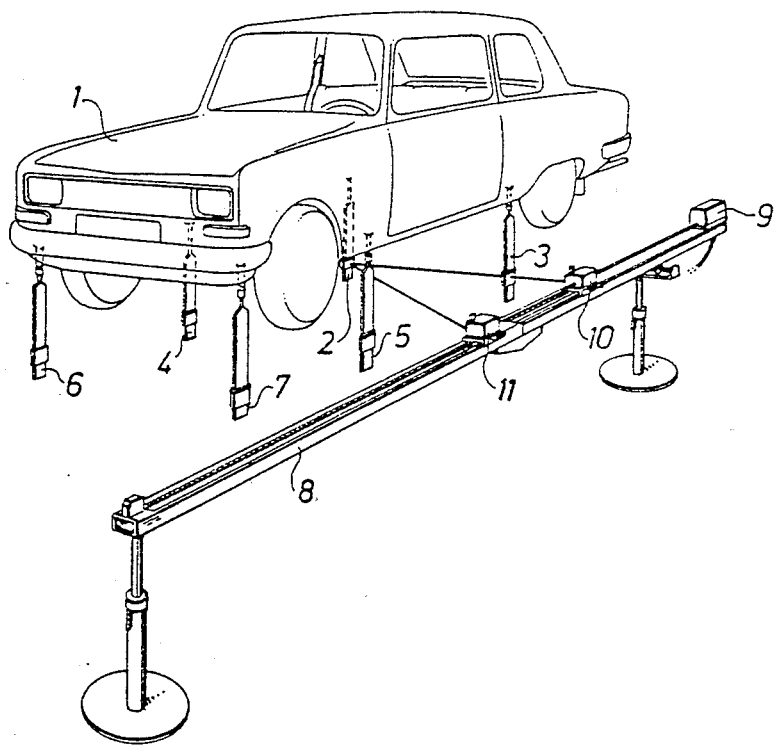
FIG. 1 shows a perspective view of an embodiment of an arrangement according to the invention for checking of a vehicle body.

FIG. 1 shows a perspective view of an embodiment of the invention arranged to check the dimensions of a car body. The car is hoisted by means of a lifting device (not shown). Rulers 2–7 are attached to suitable measuring points beneath the car 1. These measuring points are placed in different positions for different car models. Measuring points and dimensions for a standard vehicle of each car model are specified in special measuring records.

A measuring guide bar 8 is located to the side of and obliquely below in relation to the hoisted car and at a suitable working height for the operator who is to perform the measurement check. A light source 9 is fixedly located at one end of the beam 8. The important thing about the light source is that it must be able to emit a narrow collimated light beam having sufficient intensity for impingement on one of the rulers to be clearly readable by the operator where he stands at the guide bar. A laser of He—Ne type satisfies these requirements.

Shown on the guide bar are two deflection units 10 and 11, each of which deflects a beam emanating from the light source in the horizontal plane in mutually different directions so that the ruler 2 is impinged on from two directions. The position of the point of impingement in a beam-oriented coordinate system is unambiguously determined by the location along the guide bar of the deflection units 10 and 11 and the two angles between the deflected light beam from each deflection unit and the distance. In the Figure, the deflected light beams are shown to lie in a horizontal plane and to impinge on a point on the ruler in this plane but it is also possible instead of suspending rulers at the measuring points on the vehicle also to deflect the light beams with the deflecting units in the vertical plane so that they impinge directly on the different measuring points. This is particularly applicable in those cases when the positions and deflections for the two deflection units are fed to a central computer unit, as will be described further on in the description.

Figure 2:
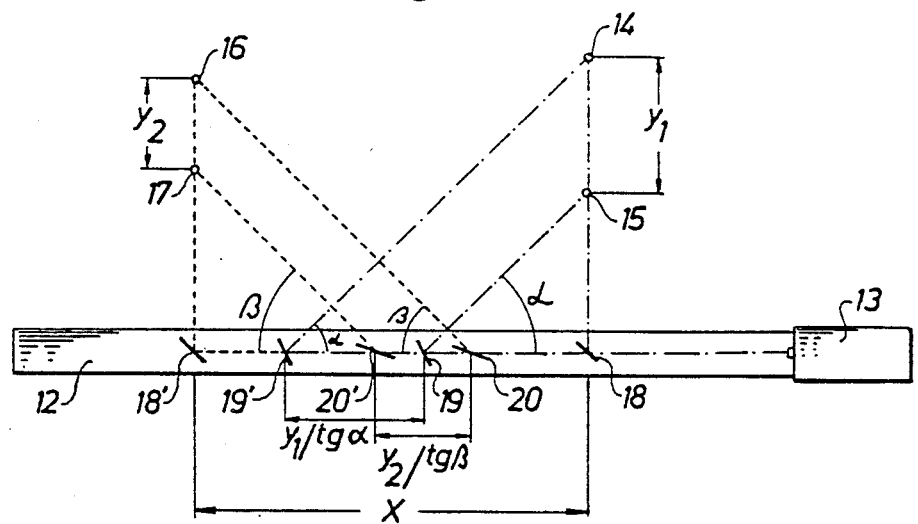
FIG. 2 shows a schematic view from above of a first embodiment of the arrangement according to the invention.

Shown schematically in FIG. 2 is a suitable embodiment of the arrangement according to the invention. The light source 13 is arranged at one end of the guide bar 12 with the light beam projected straight along the guide bar. A deflection unit 18, shown schematically as a semi-transparent mirror, but which in practice includes two reflecting surfaces placed in analogy with the reflecting surfaces of a pentagonal prism, deflects the light beam perpendicularly and essentially in a horizontal plane. Minor deviations from this of approx. 5°–6° are permissible but it is important that the angular settings of the deflection unit 18 is the same when it is placed in the two positions 18 and 18'. The impingement points 14–17 on the rulers which are suspended in the measuring points of the vehicle are marked with rings. Prior to commencement of measurement, the vehicle or the guide bar 12 is moved so that the light beam from the deflection unit passes through two points of impingement symmetrically disposed on either side of the central axis of the vehicle. When this setting has been made, the vehicle will be positioned with its longitudinal axis parallel to the guide bar.

Since the mirror 18 is semi-transparent, one light beam passes through the mirror and impinges on the other deflection unit 19, which is also shown in the form of a mirror and which also may in turn be semi-transparent in order for the laser beam from the laser 13 to be aimed accurately along the guide bar 12 with the aid of an indication unit (not shown) located at the other end of the guide bar. The deflection unit 19 deflects the beam with a predetermined angle $\alpha$ and the unit 19 is moved along the beam to a position where the beam impinges on the ruler 15. This position is marked as a "0" position and the deflection unit 19 is thereafter moved to the position 19' along the guide bar where the beam impinges on the ruler 14. The distance between the two positions 19 and 19' of the deflection unit will then be the distance $Y_1$ between the measuring points divided by tangent $\alpha$. If $\alpha$ is chosen as 45°, the indicated distance along the beam will be the same as the distance between the measuring points 14 and 15.

Measurement of the movement of the deflection units along the guide bar can take place with a measuring scale arranged on a strip free from the measuring guide bar which is attached on an adjustable and attachable clamp along the guide bar. The clamp is attached in the immediate proximity of the deflection unit at the first measuring position. An extensible length scale measuring means attached between the indicating device and the deflecting units permits direct reading on the distance between two points.

Instead of a mechanical, manually readable measuring scale, it is, however, highly appropriate to use an electronic measuring scale. The guide bar can then be equipped with one or a plurality of measuring tracks with a regular pattern and possibly also with specially inserted reference measurement tracks, the measuring tracks then being indicated optically in the form of pulses which are fed to a counter. The counter setting is presented on a visual display unit upon completion of movement. Reading of position or movement on the guide bar can also take place with the aid of information magnetically recorded on steel tapes or directly on the beam.

In order to determine the distance along the longitudinal axis of the vehicle, the deflection unit 19 is removed from the guide bar and the slide with the deflection unit 18 is moved until the deflected beam from the laser impinges on the rulers 16 and 17 at position 18'. The distance between the location of the unit 18, 18' along the guide bar gives the wanted distance. Measurement of the movement of the unit 18 along the beam is performed in the same manner as for the unit 19. If the vehicle has been damaged by collision, it may occur that the deflected beam from the unit 18 does not pass through both points of impingement 16 and 17. This gives some indication of the nature of the collision damage and the unit 18 is located for measurement of the two positions giving impingement on the impingement points 16 and 17. The deflection unit 19 with reset mirrors or prisms or a second deflection unit 20 is replaced on the beam. The deflection unit now deflects the light beam emanating from the laser 13 emanating from the beam at an obtuse angle in relation to the part of the guide bar between the light source and the deflection unit 20. The slide is first moved to a position 20 where the light beam impinges on the ruler 16. This position is marked as a "0" position and the slide is subsequently moved until the deflected beam impinges on the ruler 17. The distance between the two positions 20 and 20' of the deflection unit along the beam is the same as the distance $Y_2$ between the measuring points with the rulers 16 and 17 divided by tangent $\beta$, i.e. the tangent for 180° minus the obtuse deflection angle for the beam.

It is to be noted that for each measurement either in the x- or in the y-direction between two check points on rulers the deflection unit is preset to the angular deviation suitable for this measurement before the actual measurement, and that each measurement is made by moving one of the deflection units along the guide bar and reading off the movement distance along the guide bar. The data sheets on model cars mentioned above give the differential values in x- and y-directions between the check points. When a smashed car shall be aligned the deflection units are angularly set and are first positioned on the guide bar in a position, in which the deflected beam will impinge on one of the rulers, and is then moved along the bar to a position which according to the data sheet would give an impingement on another ruler for the model car in question for the actual angular setting. If the beam does not fall on the intended ruler, the car is aligned until it does.

Preferably each unit 18, 19 or 20 can have the same design and thus have settable angulr deflections. However, the angular setting shall be limited to a few and determined values. An embodiment to a suitable deflection unit 100 having the properties mentioned above is shown in FIG. 3. The beam 101 parallel to the guide bar from the light source (not shown) at the end of the bar impinges on a first deflection device including a base 102, on which two mirrors 103 and 104 are fixed in positions analogous with the locations of the reflecting surfaces in a pentagonal prism, such that the incoming beam 101 is deflected 90° by the deflections of the two mirrors 103, 104. The mirror 103 is semitransparent so that a part of the impinging beam 101 is transmitted along the rest of the guide bar. The base 102 with the mirrors is fixedly mounted on an axle 105, which is pivotably mounted in two axle-journals 106, 107 stationary disposed at the same height on the unit 100 on each side of the base. The axle 105 is provided with weights 108, 109 at its outer ends. The base is balanced to be horizontal when resting in the axle-journals.

The axle 105 is extended in a direction perpendicular to the bisectrix between the mirrors in the base plane. Thus, the base is free to oscillate like a pendulum around the axle 105 in a direction along said bisectrix. The outgoing deflected beam 110 will then pass through a vertical deflecting device 111 comprising two parallel circular, rotatable wedges of a kind well known in the art. Since the device 111 is not a part of the actual invention, but only represents a way to make an angular correction in vertical direction, if the outgoing beam shall not be quite horizontal, it will not be described further in detail.

Thereafter, the beam 110 will pass through a device 112 comprising a horizontal, rotatable disc 112 on which a three corner prism 113 is fixed. The periphery of the disc is provided with a scale having five marks. A mark 114 is placed on the unit 100 near the periphery of the disc. The marks on the disc represent five different set positions in order to have five different angular deviations impressed on the beam 110. When the disc is placed in the position "0", no extra deviation is impressed on the beam 110. The corner angles and the index of refraction is chosen such that for instance the disc in position "1" will give an angular deviation 45° to the left, in position "2" a deviation 20° to the left, in position "3" a deviation 45° to the right and in position "4" a deviation 20° to the right. Other angles than the ones mentioned here may be chosen. Preferably, the rotation of the disc 112 is made such that there are distinct settings for the disc, which the operator feels as snap-ins at the setting positions "0", "1", "2", "3" and "4" when rotating the disc. Thus, the prism 113 acts as a wedge prism in the different, marked positions for the disc 112 and is placed out of center of the disc.

Figure 3:
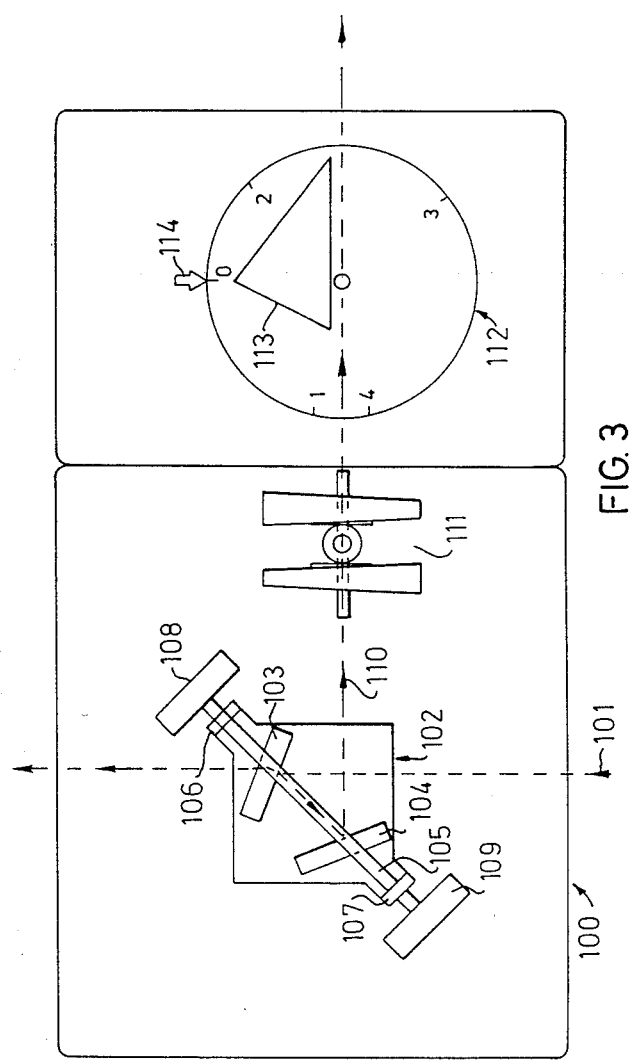
FIG. 3 shows a view from above of an embodiment of a deflection unit according to the invention.

Preferably, the device shown in FIG. 3 is cooperating with an electronic control and checking device (not shown), which includes a microprocessor, to which data regarding the model of the car to be measured and/or aligned are fed just before a measurement and-/or alignment operation. (This feature replaces the data sheets mentioned above). Instructions for the operator regarding the settings of the beam deflecting device is shown on a display (not shown). The control and checking device makes the measurements of the movements along the guide beam automatically.

When the deflection unit is provided with an electronic control and checking device the settings of the disc can be automatically controlled electronically in such a way that measurements cannot be made, if the angular setting of the disc is not exact, i.e. if a mark on the disc is not placed exactly in front of the mark 114. In manufacture of the device 100 it is not possible to have exactly the same dimensions on the discs 112 with the prism 113. Therefore, reference measurements are made at the manufacture and correction values for the specific angular positions of the disc are stored in a read only memory in the microcomputer. In this way the measurement functions will be the same for all the manufactured deflection devices.

A device of the kind shown in FIG. 3 may be used as a single light deflection device placed on the guide beam, in which case the disc is set at "0" for measurements in the x-direction and at some of the other settings for measurements in the y-direction. The advantage of having only one light deflection device is that the measuring device according to the invention can be manufactured and sold at a lower price than if two deflection devices are placed on the bar. Disadvantageous is however, that the operator must do more alignment operations on the car, since only one light beam at the time impinges on each checking point, which in turn means that the operator must make every alignment operation in two steps, one along the x-axis and one along the y-axis. Two deflection units on the bar thus gives an easier operation for the operator but results in a more expensive measuring device.

The embodiment described with reference to FIG. 2 gives a very short guide bar. It is, however, obvious that it lies within the scope of the invention to have two deflection units each having individual fixed deflection mirrors or deflection prism and to perform the measurement as shown extremely schematically in FIG. 4. In this case the perpendicularly deflecting unit is first placed in position 21. The vehicle or the guide bar is adjusted so that they become positioned parallel to each other in that the deflection beam from the unit placed in position 21 passes through the two points of impingement 14 and 15. The distance $Y_1$ between the points of impingement 14 and 15 is determined in the same manner as according to the embodiment shown in FIG. 2 in that a deflection unit which deflects the laser beam with the angle $\gamma$ is moved between positions 22 and 22" on the beam. The perpendicularly deflecting unit is moved to position 21' so that the beam from the laser impinges on rulers 16 and 17. The obtusely deflecting unit is moved so that rulers 16 and 17 are consecutively impinged on by the beam. As will be explained further on in the description, very reliable and accurate indication can be obtained, that two beams projected onto a measuring point from two different directions actually do impinge on the same point.

If the measured vehicle is to be aligned, the measuring points must have certain specific positions indicated in special measuring records for the car model concerned. When the car and the guide bar have been positioned parallel, the deflection units are in this case placed consecutively in those positions along the guide bar in which the deflection beam according to data for the car model concerned are to impinge on the ruler at which the beam is aimed. Every time the beam does not impinge on an intended ruler at the intended height, the vehicle is aligned until it does so.

An electronically scanned measuring scale gives a significant advantage in relation to a mechanically read off measuring scale in that the measuring result can be transmitted to a calculating unit, such as a computer, which can perform necessary calculations rapidly and reliably. If the slides carrying the deflection units are equipped with dirigible drive motors, an operator can perform the entire measuring operations standing at an instrument panel. In the case of electronically determined distances, there is no need to set the vehicle and guide bar parallel to each other prior to the actual measurement. Nor is it necessary to attach measuring rules at the measuring points and instead the beams from the deflection units can be directed in different positions also in the vertical direction so that each measuring point can be impinged on directly. The instrument panel can be equipped with calculating units to calculate after input of two measuring points the angle between the longitudinal axis of the vehicle and the guide bar. The calculating unit may, for example, consist of a microcomputer or a minicomputer with associated memory circuits. Measuring data for different car models may be stored on tape cassettes, magnetic cards, etc. When checking a specific car model, the operator transmits this measuring data to the computer memory in a conventional manner. Measurement can take place according to the pattern shown schematically in FIG. 4. Either one or two deflection units may be used.

If only one deflection unit is used, this is equipped with a deflector settable in defined steps. It is evident from FIG. 4 that neither deflection need take place at a right angle to the beam. In FIG. 5, the deflection is shown partly at an obtuse angle of $180°-\phi$, where $\phi$ is the acute angle of the light beam to the beam and at an actue angle $\theta$. Different types of setting arrangements for deflection will be described further along in the description.

It is difficult to perform alignments several times for each point of impingement. For this reason measurement is preferably made with the use of two deflection units. The two units occupy the starting position at 24. Somewhere between positions 24 and 25, an "0" setting marking may be provided so that the two deflection units are zero set at the same position on the beam. At the first measurement, the one deflection unit which deflects the beam $\theta$ is run to the position 28 and the other deflection unit which deflects the beam at an angle of $180°-\phi$ is run to position 25, in which positions the two deflection light beams from the two units impinge simultaneously on the same point of impingement 14. The units are thereafter moved to positions 27 and 26 respectively where the deflected light beams impinge on the impingement point 15. The computer calculates the position in space for the connection line between the impingement points 14 and 15, calculates if the distance between these points is in agreement with the standard data, calculates the positions in space for other points of impingement 16, 17 and the positions on the guide bar for the deflection units in order for the deflected light beams to impinge on these points of impingement and operates, possibly automatically, the deflection units so that they are consecutively run to the positions concerned. For each point of impingement, the vehicle is aligned until both light beams impinge on the impingement point. This embodiment has been described with reference to alignment of a vehicle but it is obvious that measurements of a vehicle simply in order to determine deviations from standard data is equally simple to perform. In this case, the operator merely runs the deflection unit to the positions in which the deflected light beams impinge consecutively on the impingement points. After measurement has been performed, the computer indicates the calculated positions on a visual display unit, for example in the form of points with a certain colour such as red, in which case the standard positions are marked on the visual display unit in some other colour, such as green. The calculated measurement values can obviously also or instead be indicated with numerical values or in some other manner.

When two light beams are to impinge on an impingement point on, for example, a ruler, it may be difficult to distinguish that both points of impingement are actually there. One way of remedying this is to permit the light beams to impinge on the rulers with a certain difference in height so that the operator sees two illuminated points, one above the other. One method which gives a more exact result is, however, to permit the light from the two deflection units to be extinguished and switched on with a frequency interpreted by the eye as flashing and to permit the modulation from the light from the two units to be 180° out of phase in relation to each other. Either the light interval can cover a phase angle of 180° or else the modulation frequency may be chosen such that flashings with double the modulation frequency are interpreted by the eye as steady light. In both cases, the eye discerns very clearly if the light beams emanating from the deflection units do not impinge on exactly the same points in that the light from the impingement point flickers. Only when the two light beams are exactly set to impinge on the point does the light appear as steady light.

Figure 6:
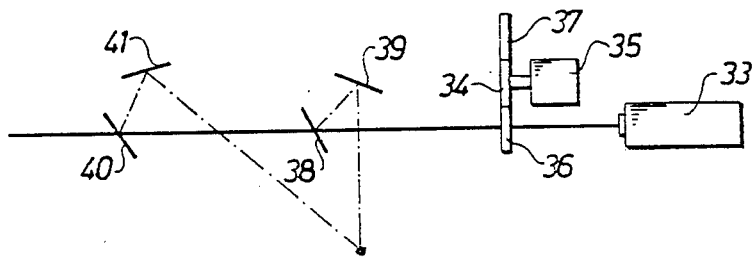
FIG. 6 shows an embodiment to accomplish flashing frequency of the used light.

FIG. 6 shows an embodiment to accomplish modulation of the two light beams. Placed in front of the laser viewed in the direction of radiation is a rotating disc 34 which is driven by a drive motor 35. The disc comprises two sections 36 and 37 with polarizers oriented at right angles in relation to each other. These polarizers are appropriately disposed in a ring in the disc 34, each section 36, 37 then occupying a semi-circle. Instead of the rotating disc 34, a Pockel's cell can be placed in front of the laser 33 and excited with an alternating voltage with a suitable modulation frequency of 3–13 Hz. Two deflection units 38, 39 and 40, 41 are provided on the guide bar. Both have the mirrors arranged in analogy with the reflecting surfaces of a pentagonal prism. The unit 38, 39 has to accomplish perpendicular deflection of the radiation from the laser 33 and the angle between the mirrors is then 45°. The unit 40, 41 has to accomplish an acute deflection of the radiation from the laser 33 and if this angle is 45°, the angle between the mirrors 40, 41 is 67.5°. By placing the mirrors in the unit in analogy with the reflecting surfaces in a pentagonal prism, insensitivity to turning of the slide on the beam is obtained.

If, now, the mirror 38 is a polarized mirror, for example with a dicroic coating, which mirror reflects light polarized in one direction and permits light to pass through polarized in another direction, the radiation is reflected by the mirror during half the revolution of the rotating disc 34 and transmitted to the other deflection unit 40, 41 during the other half thereof. The same function can also be accomplished without a rotating disc 34, if the mirror 38 has a mirror coating of liquid crystal which can be transformed into a reflecting or transmitting state by supplying a voltage to the mirror.

Figure 7:
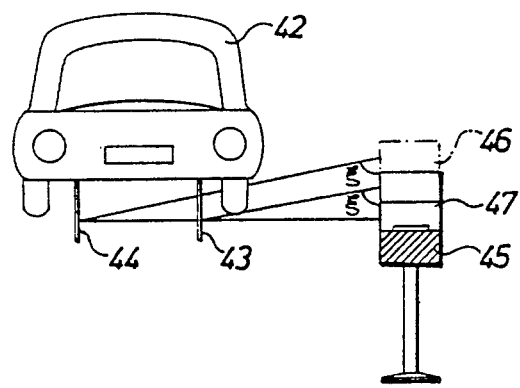
FIG. 7 shows a side view of a further embodiment of an arrangement according to the invention.

FIG. 7 shows an embodiment in which the second deflection unit is placed above the first deflection unit. The car 42 is provided with measuring rulers 43 and 44. A guide bar 45 is located beside the vehicle and is equipped with a deflection unit which at differnt heights above the bar projects two light beams onto a relevant measuring point. The upper part 46 of the deflection unit 47 is vertically adjustable whereas the angle ξ between the distance which connects the output positions for the deflected light beams is kept constant. It is thus the distance between the starting positions of the light beams that is varied.

In the embodiment according to FIG. 7, extremely great accuracy is obtained particularly if the above-mentioned system with flashing light in counter phase for the two deflected light beams is used. A suitable modulation frequency may lie between 3 and 13 Hz.

Shown in FIGS. 8 to 10 are three embodiments of deflection units with settable deflections in three different positions. In the deflection unit 46' in FIG. 8, three electrically settable liquid crystal mirrors 47', 48,49 are positioned consecutively in the direction of the light beam. The mirrors 47', 48, 49 have one of their electrodes connected to a selector 50 with three positions which in each position connects one of the mirrors to the potential $V_c$ which sets the liquid crystals into the reflecting state and the two others to the potential $V_b$ which sets the liquid crystals into the transparent state. The other electrode of the liquid crystal mirrors is connected to earth (not shown). A fixed mirror 51-53 placed in the unit 46' belongs to each liquid crystal mirror 47', 48, 49. Each pair of cooperating mirrors 47', 51; 48, 52; 49, 53 is placed in analogy with the reflecting surfaces in a pentagonal prism. This provides insensitivity to turning of the unit 46' on the guide bar. The mirrors 47' and 51 are shown in the Figure to deflect the light beam at an obtuse angle of 135° to the bar, the mirrors then being set at a mutual angle of 22.5° in relation to each other. The mirrors 48 and 52 deflect at a right angle and the mirrors are then set at an angle of 45° in relation to each other. Finally, the mirrors 49 and 53 are shown to deflect the light beam at an abut angle of 45° to the bar, the mirrors 49 and 53 then being set at an angle of 67.5° in relation to each other. The mirrors have been placed so that for each pair of mirrors, the light beam passes through the optical axis for the incident light beam at the same point, which may be defined as the starting point of the deflected light beam. The casing of the unit 46' is provided with small openings at the entrance and the exit for the light beam. Instead of having electrically adjustable mirrors 47', 48, 49 of liquid crystal, an ordinary semi-transparent mirror for each desired deflection position can be disposed mechanically in the intended position illustrated in the figure.

If the deflection unit in FIG. 8 is placed nearest to the laser of the two deflection units, the light beam can be modulated with a flashing frequency in that the active mirror 47', 48 or 49 is excited with a potential, which changes cyclically between $V_b$ and $V_c$.

FIG. 9 shows a second embodiment of an electrically settable deflection unit with several resettable deflection positions. In this, a stationary mirror 55 is placed in the beam path for the incident light beam from the laser. The mirror 55 is appropriately semi-transparent so that the light beam can continue to a next deflection unit and possibly to a unit for correct setting of the laser light beam along the guide bar. Three controllable mirrors 56-58 of liquid crystal are placed in the beam path for the light beam deflected by the mirror 55. The three mirrors 56 to 58 deflect the light beam in different directions so that the mirror 56 permits the light beam to go out at an acute angle in relation to the incident light beam, the mirror 57 permits the light beam to go at a right angle to the incident light beam and the mirror 58 permits the light beam to go out at an obtuse angle in relation to the incident light beam. Precisely as in the embodiment shown in FIG. 8, the mirrors 56 to 58 can be placed so that the deflected light beams pass through the same point, but this is not entirely necessary since corrections can be performed in the value read off for each special deflection position. The mirrors 56 to 58 are controlled in the same manner as the mirrors 47', 48, 49 in the embodiment shown in FIG. 8.

Modulation of the emitted light beam with the flashing frequency can be obtained if the mirror 55 is also a mirror with liquid crystal which is excited with a voltage that cyclically switches between the voltages $V_b$ and $V_c$.

FIG. 10 shows a third embodiment to accomplish deflection in different selectable deflection directions. A mirror 59 which may, for example, be semi-transparent, is placed in the path of the incident light beam from the laser and reflects the radiation to a second mirror 60 which can be turned to a desired predetermined position by means of, for example, a knob or by means of a small drive motor of the like so that desired radiation directions for the light beam can be set. The settings can be checked electronically in the set positions in the same way as for the settings of the disc 112 in FIG. 3. It is utterly important that the angular settings are precise. It is also obvious that instead of having a turnable mirror 60, a mirror placed in this position can be stationary and the mirror 59 instead be turnable. In this latter case, several fixed mirrors with different angles can be arranged and so positioned that the deflected light beams are able to pass through the same point on the optical axis of the incident light beam.

Figure 4:
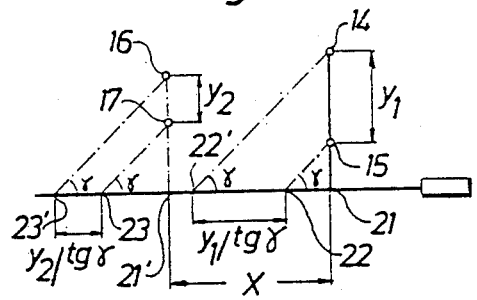
FIG. 4 shows schematically on a smaller scale a view from above of a second embodiment of the arrangement according to the invention.
Figure 5:
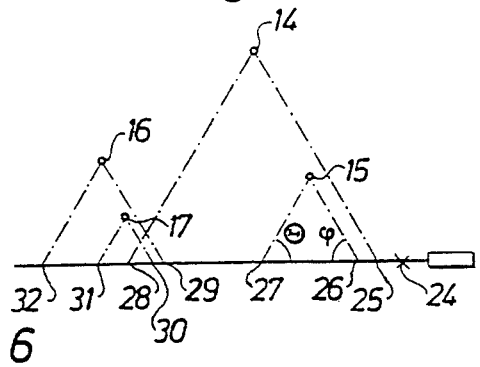
FIG. 5 shows schematically a view from above of a third embodiment of the arrangement according to the invention.

As evident from FIG. 4, it is not entirely necessary in order to make use of the invention for the deflection unit to have settable deflections. In many applications of the invention, it is desirable for the deflected light beam to be able to be kept horizontal. In deflection units with fixed deflection, such levelling can be accomplished by equipping the unit with a level which is parallel with the bisectrix of the angle between the reflecting surfaces in the plane of the beam. This is shown schematically in FIG. 11 where the semi-transparent mirror 61 and the mirror 62 accomplish a perpendicular deflection of the light beam shown in this figure in unbroken lines. The level is placed together with a levelling device so oriented that the bisectrix 63 shown in the figure with broken lines is kept horizontal.

Figure 12:
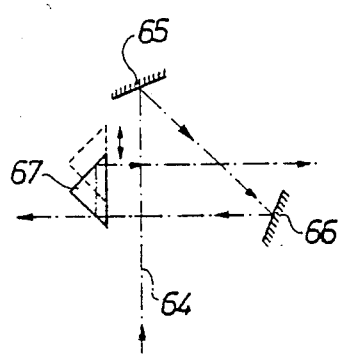
Figure 13:
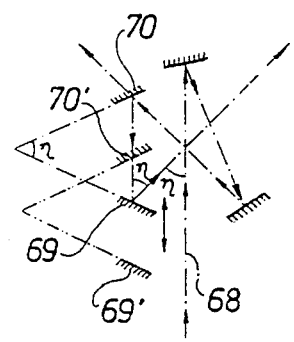
Figure 14:
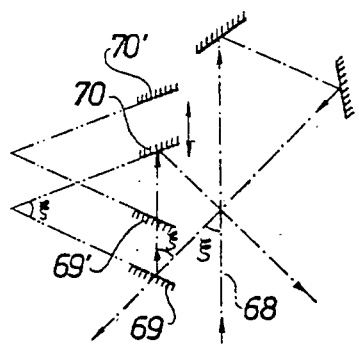

On many occasions, it will be desirable to be able to place the beam on an optional side of the object to be measured. It is therefore a requirement for the deflection units to be adjustable so that they are alternatively right-deflecting or left-deflecting. FIG. 12 shows an embodiment for an adjustable deflection unit with 90° deflection in relation to the beam. The incident light beam 64 is deflected 90° to the left by the mirrors 65 and 66 placed in analogy with the reflecting surfaces of a pentagonal prism in the light path. A movable Porro prism or retrodirective prism 67 in the unit can be placed either in the light beam path from the mirrors 65 and 66 in order to deflect the light beam towards the right (shown with unbroken lines) or placed beyond the light beam (shown in broken lines). FIGS. 13 and 14 show two embodiments with a deflection unit which deflects the incident light beam 68 towards the left at an angle other than 90° to the guide bar. Obtuse deflection is shown in FIG. 13 and acute deflection is shown in FIG. 14. In both cases, a change to deflection towards the right can be accomplished in that two movable interconnected mirrors 69, 70 can be inserted in the light beam path for the outgoing light beam. The mirrors 69, 70 are set at an angle in relation to each other of $\xi$ or $\eta$ which agrees with the acute angle between the outgoing light beam and the guide bar. This implies that the same arrangement of mirrors 69, 70 can be used for a deflection unit which is adjustable for deflection at alternatively an obtuse or an acute angle if only the angle between the outgoing light beam and the guide bar is equally large.

Figure 15:
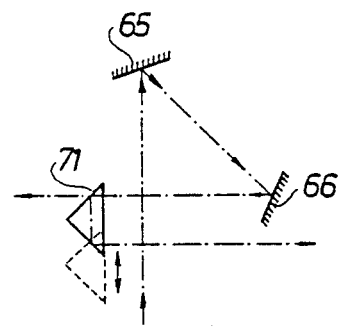
Figure 16:
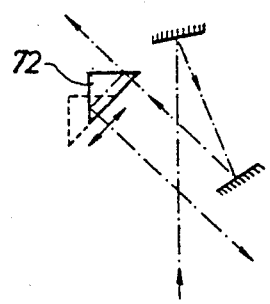
Figure 17:
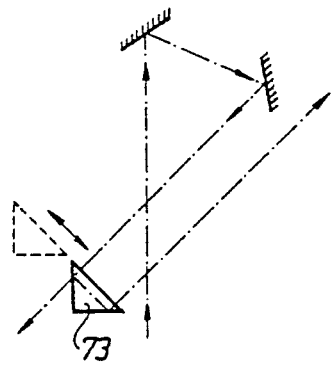

In FIGS. 13 and 14, the resetting unit 69, 70 is shown to reset the light beam so that it intersects the incident light beam 68 at the same point as that deflected towards the left. This is absolutely unnecessary. Since, as a rule, only movements between different positions along the guide bar for the unit are of interest, it is of no importance where the reset deflected light beam intersects the incident light beam. Certain difficulties are, however, involved in setting a Porro prism so that the emitted light beam from the deflection unit actually ends up in a horizontal plane. For this reason, it is more appropriate to use a cube corner prism 71, 72, 73 as a resetting means. This is shown in FIGS. 15 and 16. A cube corner prism reflects an incident light beam exactly anti-parallel. This is of no significance in perpendicular deflection as evident from FIG. 15. In the case of deflection units with other deflection than perpendicular, resetting will result in an obtuse deflection in one direction and an acute deflection in the other direction and vice versa. This is shown in FIGS. 16 and 17. Other types of resetting devices are naturally conceivable. If adjustable mirrors with liquid crystal are used, a deflection unit may, for example, comprise two deflection arrangements after each other along the guide bar, where one deflects towards the right and the other towards the left, the mirrors placed in the light beam path along the guide bar being resettable alternatively to transparent, reflecting or semi-transparent states.

Several modifications are possible within the scope of the invention.

It is to be noted that the electric processing device connected to the deflection unit or units is programmed to make the calculations having the set deviation angle as a constant provided to the processing device when the operator sets the deflection unit to one of the possible angular settings and the movements along the guide bar as a variable.

What we claim is:

1. An apparatus for checking dimensions in two dimensions in a horizontal plane of large objects having predetermined checking points, comprising:
   a single straight measuring guide bar having a longitudinal axis;
   a light source located at one end of the guide bar arranged to project a beam along a path parallel to the guide bar;
   at least two light-deflecting units each of which receives and deflects a light beam from said light source, each light-deflecting unit having selection means for selecting one beam deflection angle out of a limited amount of predetermined, exactly defined, presettable beam deflection angles which are angled with respect to a vertical plane containing the longitudinal axis of the guide bar, the beam-deflecting unit comprising two reflecting surfaces located in the beam path in a manner similar to the reflecting surfaces of a pentagonal prism such that the deflected light beams have different intersecting points with said plane;
   at least one slidable unit containing at least one of said light-deflecting units being movable along the guide bar such that the light-deflecting units have their individual deflected light beams impinging on each checking point simultaneously, and by movement of said at least one slidable unit containing said at least one of said light-deflecting units having a preset beam deflection angle the intersecting point with the vertical plane of the beam moves in the plane; whereby by comparison of predetermined data for two dimensional distances between checking points of a model object of said object which is related to distances in said vertical plane for specific angular settings of said light-deflecting units and the corresponding angular position between each light beam and the vertical plane and the relative longitudinal positions of the intersecting points within the vertical plane, the dimensions in two dimensions of the object are checked.

2. Apparatus according to claim 1, characterized in that one beam-deflecting unit is arranged to deflect a beam at a preset angle of 90 degrees to the guide bar and the other at a preset angle of 45 degrees to the guide bar.

3. Apparatus according to claim 1, including means to modulate the beams which simultaneously impinge on a selected checking point with opposite phase positions relative to each other at a frequency which causes light on a point from only one light beam to be seen by the eye as a flashing light.

4. Apparatus according to claim 3, characterized in that said means to modulate the beams is adapted to effect the beam-deflecting unit closest to the light source, which unit comprises a polarized mirror located in the light beam path which deflects light polarized in one direction and which passes light polarized in the other direction, and a polarization switching means being provided between the light source and said deflection unit, which alternatingly shifts the direction of polarization through 90 degrees in relation to each other.

5. Apparatus according to claim 4, characterized in that the polarization switching means is a rotating disc having an angular part of mutually intersecting polarities, which disc is disposed to have a part of said annular part intersecting the beam path so that said polarizers are alternatingly inserted in the beam path.

6. Apparatus according to claim 4, characterized in that the polarization switching means is a Pockel's cell excited with alternating voltage.

7. Apparatus according to claim 1, characterized in that the deflected beams are arranged to be deflected from a confined unit on said guide bar with respective mutually spaced starting points that can be set at different distances from each other.

8. Apparatus according to claim 1, characterized in that the angle between said two reflecting surfaces in the light-deflecting unit being selected to give the deflection angle.

9. Apparatus according to claim 1, characterized in that several different deflection devices are provided in one beam-deflecting unit, wherein a reflecting surface in each deflecting means is alterable by control so that for a desired deflection only the deflection means for that deflection is effective in the beam path from the light source.

10. Apparatus according to claim 1, characterized in that the reflecting surfaces comprise liquid crystal cells which are electrically convertable alternatively between their reflecting and transparent states.

11. Apparatus according to claim 1, characterized in that the selected different angles of deflection of a beam-deflecting unit are accomplished by mounting one reflecting surface to be turnable.

12. Apparatus according to claim 1, characterized in that at least one of said beam-deflecting units has two reflecting surfaces having unchangeable deflection angles and is provided with a levelling device and a level sensor so oriented that the bisector of the angle between the incoming and outgoing beams is adjustable to be horizontal.

13. Apparatus according to claim 1, characterized in that the beam-deflecting unit is provided with resetting means for selecting right-hand or left-hand deflection.

14. Apparatus according to claim 13, characterized in that the resetting means comprises a unit with two reflecting surfaces set at the same angle to each other as the angle between the light beam deflected by the light-deflecting unit and the incident light beam to the light-deflecting unit, the said resetting means upon resetting being placed with one of its reflecting surfaces in the beam path for the outgoing light beam.

15. Apparatus according to claim 13, characterized in that the resetting means comprises a movable cube corner prism.

16. Apparatus according to claim 1, characterized in that the angle between the two reflecting surfaces in the light-deflecting unit being selected to give the deflection angle 90 degrees and that a wedge is placeable in the outgoing beam path to give the additional selected deviation angle.

17. Apparatus according to claim 16, characterized in that said wedge is a three corner prism placed out of center on a substantially horizontal rotatable disc having predetermined settable angular positions, one for each selectable deviation angle.

18. An apparatus for checking dimensions in two dimensions in a horizontal plane of large objects having predetermined checking points, comprising:
a single straight measuring guide bar having a longitudinal axis;
a light source located at one end of the guide bar arranged to project a beam along a path parallel to the guide bar;
at least one light-deflecting unit which receives and deflects a light beam from said light source, each light-deflecting unit having selection means for selecting one beam deflection angle out of a limited amount of predetermined, exactly defined, presettable beam deflection angles which are angled with respect to a vertical plane containing the longitudinal axis of the guide bar, the beam-deflecting unit comprising two reflecting surfaces located in the beam path in a manner similar to the reflecting surfaces of a pentagonal prism, said selection means comprising a wedge prism selectively placeable in the outgoing beam;
at least one slidable unit containing said light-deflecting unit being movable along the guide bar such that the light deflecting unit is moved to have its individual deflected light beam impinging on each checking point, and by movement of said at least one slidable unit containing said light-deflecting unit having a preset beam deflection angle the intersecting point with the vertical plane of the beam moves in the plane; whereby by comparison of predetermined data for two dimensional distances between checking-points of a model object of said object to be checked related to distances in said vertical plane for specific angular settings of said light-deflecting unit, and the angular position between each light beam and the vertical plane and the relative longitudinal positions of the intersecting points within the vertical plane, the dimensions in two dimensions of the object are checked.

19. An apparatus according to claim 18, characterized in that said wedges in said selection means comprise a three corner prism mounted out of center of a horizontal rotatable disc, having its center in the extension of the outgoing beam from said pentagonal device and distinct angular setting positions marked around its periphery.

20. An apparatus according to claim 19, characterized in that the locations of the predetermined settings are electronically checked and checking operation of said apparatus prohibited if said disc is not located in one of said predetermined angular positions.

* * * * *